US008850393B2

(12) United States Patent
Castro et al.

(10) Patent No.: US 8,850,393 B2
(45) Date of Patent: Sep. 30, 2014

(54) METHOD AND APPARATUS FOR TESTING SOFTWARE

(75) Inventors: Paul C. Castro, Harrison, NY (US); Frederique A. Giraud, Ossining, NY (US); Ravindranath Konuru, Tarrytown, NY (US); Apratim Purakayastha, Yorktown Heights, NY (US); Danny L. Yeh, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 1314 days.

(21) Appl. No.: 12/125,103

(22) Filed: May 22, 2008

(65) Prior Publication Data
US 2008/0229284 A1 Sep. 18, 2008

Related U.S. Application Data

(63) Continuation of application No. 11/372,956, filed on Mar. 10, 2006, now abandoned.

(51) Int. Cl.
| G06F 9/44 | (2006.01) |
| G06F 9/445 | (2006.01) |
| G06F 11/00 | (2006.01) |
| G06F 11/36 | (2006.01) |

(52) U.S. Cl.
CPC .......... *G06F 11/368* (2013.01); *G06F 11/3688* (2013.01)
USPC ........................... 717/124; 717/178; 714/38.1

(58) Field of Classification Search
None
See application file for complete search history.

(56) References Cited

U.S. PATENT DOCUMENTS

| 5,371,883 | A | | 12/1994 | Gross et al. ................... 395/575 |
| 5,634,098 | A | | 5/1997 | Janniro et al. |
| 5,742,754 | A | * | 4/1998 | Tse ............................ 714/38.14 |
| 5,751,941 | A | | 5/1998 | Hinds et al. |
| 5,758,070 | A | * | 5/1998 | Lawrence ..................... 709/220 |
| 5,815,712 | A | | 9/1998 | Bristor et al. |
| 5,896,495 | A | | 4/1999 | Stein et al. |
| 6,014,760 | A | * | 1/2000 | Silva et al. ........................ 714/46 |
| 6,016,554 | A | | 1/2000 | Skrovan et al. |
| 6,163,805 | A | * | 12/2000 | Silva et al. ..................... 709/227 |
| 6,167,537 | A | * | 12/2000 | Silva et al. ....................... 714/46 |
| 6,243,833 | B1 | | 6/2001 | Hitchcock et al. |

(Continued)

OTHER PUBLICATIONS

Honeycutt, J., "Deployment Testing with Virtual PC 2004," Microsoft Corporation 2006.

(Continued)

*Primary Examiner* — Don Wong
*Assistant Examiner* — Todd Aguilera
(74) *Attorney, Agent, or Firm* — Anne V. Dougherty; Ryan, Mason & Lewis, LLP (57) ABSTRACT

Techniques are provided for testing new software slated to be deployed on a target machine population with a number of target machines having a number of existing software programs. Method steps can include obtaining a list of depending software programs on selected ones of the target machines. The list can include those of the existing software programs which depend on the new software and/or those of the existing software programs on which the new software depends. The steps can further include identifying relevant test cases based on the list of depending software programs, instantiating a plurality of test client platforms characteristic of the target machine population, and testing the relevant test cases on the plurality of test client platforms to identify failures.

22 Claims, 3 Drawing Sheets

(56) References Cited

U.S. PATENT DOCUMENTS

| | | | |
|---|---|---|---|
| 6,279,122 B1 | 8/2001 | Hitchcock et al. | |
| 6,324,683 B1 | 11/2001 | Fuh et al. | |
| 6,360,268 B1 * | 3/2002 | Silva et al. | 709/227 |
| 6,779,134 B1 | 8/2004 | Laviolette et al. | 714/38 |
| 6,950,964 B1 * | 9/2005 | McMichael et al. | 714/38.13 |
| 6,959,433 B1 * | 10/2005 | Morales et al. | 717/127 |
| 7,085,232 B1 * | 8/2006 | Raissinia et al. | 370/235 |
| 7,099,915 B1 * | 8/2006 | Tenereillo et al. | 709/203 |
| 7,437,713 B2 * | 10/2008 | Beardsley et al. | 717/124 |
| 7,568,183 B1 * | 7/2009 | Hardy et al. | 717/121 |
| 7,890,951 B2 * | 2/2011 | Vinberg et al. | 717/174 |
| 7,945,416 B2 * | 5/2011 | Haemel et al. | 702/117 |
| 8,131,514 B2 * | 3/2012 | Royan et al. | 703/1 |
| 8,131,952 B2 * | 3/2012 | Jang et al. | 711/156 |
| 8,145,738 B2 * | 3/2012 | Nguyen et al. | 709/223 |
| 2003/0131088 A1 * | 7/2003 | Morrissey et al. | 709/223 |
| 2003/0131285 A1 | 7/2003 | Beardsley et al. | |
| 2003/0140138 A1 | 7/2003 | Dygon et al. | |
| 2004/0078692 A1 * | 4/2004 | Jackson et al. | 714/38 |
| 2005/0166094 A1 | 7/2005 | Blackwell et al. | |
| 2006/0037002 A1 * | 2/2006 | Vinberg et al. | 717/124 |
| 2006/0129664 A1 * | 6/2006 | Reimert et al. | 709/223 |
| 2006/0242241 A1 * | 10/2006 | Tock et al. | 709/206 |
| 2007/0022324 A1 | 1/2007 | Chang et al. | |
| 2007/0162820 A1 * | 7/2007 | Choi | 714/758 |
| 2007/0168970 A1 | 7/2007 | Li et al. | |
| 2007/0214391 A1 * | 9/2007 | Castro et al. | 714/38 |
| 2007/0226027 A1 * | 9/2007 | Chang et al. | 705/8 |
| 2008/0077710 A1 * | 3/2008 | Kouvelas et al. | 709/250 |
| 2010/0115149 A1 * | 5/2010 | Ewer | 710/19 |
| 2011/0171948 A1 * | 7/2011 | Labuda et al. | 455/422.1 |

OTHER PUBLICATIONS

Honeycutt, J., "Using Virtual Server 2005 in Desktop Deployment," Microsoft Corporation, Mar. 28, 2005.

Anonymous, "Application Compatibility: Overview," Microsoft TechNet, Microsoft Corporation 2006.

* cited by examiner

METHOD AND APPARATUS FOR TESTING SOFTWARE

CROSS-REFERENCE TO RELATED APPLICATIONS

This application is a continuation of U.S. patent application Ser. No. 11/372,956, filed Mar. 10, 2006 now abandoned, incorporated by reference herein.

FIELD OF THE INVENTION

The present invention generally relates to information technology and data processing, and, more particularly, to a method and apparatus for testing software

BACKGROUND OF THE INVENTION

Deploying new software to a population of client platforms is a costly process for both software vendors and their enterprise customers, due to the common occurrence of failures Recovery from such failures usually entails platform users calling a support center multiple times; when problems nevertheless remain unresolved, technical support personnel may be dispatched to the user work place. One reason for the prevalence of deployment failures is neglecting to test the new software against the failed client platform configuration. The inability to test new software against pertinent possible client platform configurations may be a problem for the software vendor, but is likely far less problematic in the case of an enterprise An enterprise usually knows the configuration of all the client platforms that are being used in its domain of control, and thus an enterprise software deployment team can likely do a more thorough job of testing new software than could a software vendor who lacks such information.

Software is generally deployed to a specific platform. A "platform" includes software that enables other software applications. A common function found in many platforms is life cycle management of the software components running on the platform and exporting of their interfaces for use by other components. A deployment failure can occur, for example, when the newly deployed software failed to install properly or to perform as expected, or caused problems to the existing software on the target client software platform.

U.S. Pat. No. 6,779,134 to Laviolette et al. discloses a software test system and method that detects a hardware configuration of each of a plurality of test stations that are coupled to a processor such as a test center server The software test system and method stores hardware configuration data representing the detected hardware configuration of each of the plurality of test stations and provides the hardware configuration data for use in determining which of the plurality of test stations is a suitable test station for testing target software to be tested. The test stations are dynamically configurable to contain and operate differing operating systems, test software, software to be tested and other suitable applications. A plurality of test stations coupled to a test center server each have different hardware configurations. The software test system and method provides selectability of test station configuration data such as selectable data including differing operating systems, different target software to be tested on at least one of the plurality of test stations and differing test software capable of testing the selected target software to be tested. However, the Laviolette et al. reference does not teach how one might efficiently determine an appropriate set of client platforms and test cases to test for deployment.

It would be desirable to overcome the limitations in previous approaches.

SUMMARY OF THE INVENTION

Principles of the present invention provide techniques for testing software. An exemplary method (which can be computer-implemented) for testing new software (including new versions of existing software), according to one aspect of the invention, can include steps as set forth herein The new software can be slated to be deployed on a target machine population with a number of target machines The target machines can have a number of existing software programs.

The steps can include obtaining a list of depending software programs on selected ones of the target machines (preferably each target machine). The list can include those of the existing software programs which depend on the new software and/or those of the existing software programs on which the new software depends The steps can further include identifying relevant test cases based on the list of depending software programs, instantiating a plurality of test client platforms characteristic of the target machine population, and testing the relevant test cases on the plurality of test client platforms to identify failures.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, identification of an appropriate (e g, minimal) set of client platform configurations for use in testing and a set of test cases; because the selection can potentially be from among the entire population of client platform configurations targeted for deployment, the chance of a deployment failure caused by an untested client platform configuration can be reduced. Furthermore, to reduce testing time, new software can be tested against a set of test client platforms that emulate client platform configurations identified in the appropriate set of configurations. These test client platforms can be built, e.g., on physical computers or created as virtual platforms on a powerful server node.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
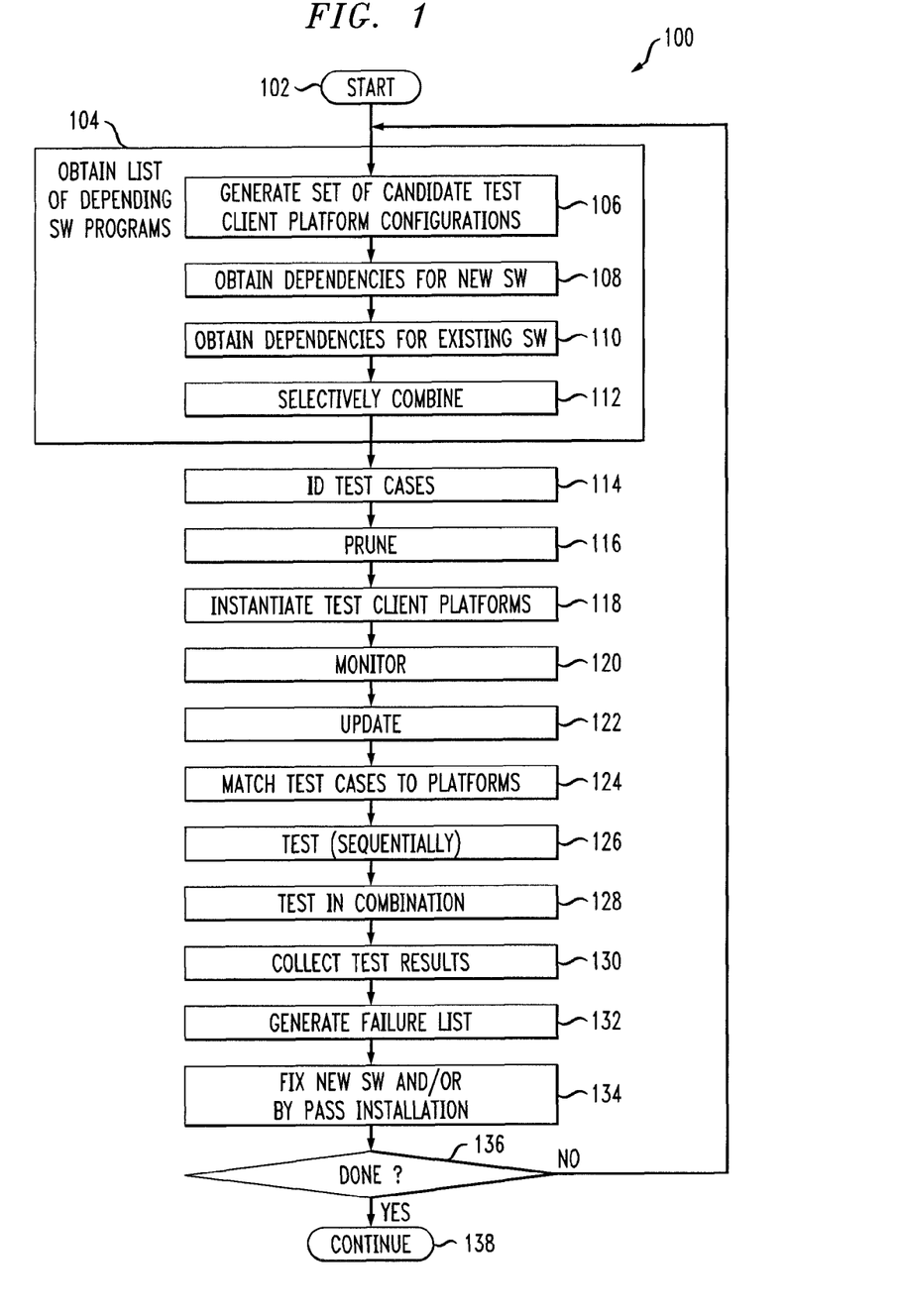
FIG. 1 is a high level flow chart depicting exemplary method steps for testing new software according to an aspect of the present invention.

FIG. 1 shows a flow chart 100 of exemplary method steps in a method (which can be computer-implemented) for testing new software (broadly understood to include new versions of existing software), according to one aspect of the invention. The new software can be slated to be deployed on a target machine population with a number of target machines The target machines can have a number of existing software programs.

After beginning at block 102, the method can include the step, depicted at block 104, of obtaining a list of depending software programs on selected ones of the target machines. The list can include those of the existing software programs which depend on the new software and/or those of the existing software programs on which the new software depends. Stated differently, in the general case, the list could include both (i) those of the existing software programs which depend on the new software and (ii) those of the existing software programs on which the new software depends, but in a given particular case there might be, for example, only programs of type (i) or only programs of type (ii). By way of an example of depending software programs, a target machine might have a word processing application and an e-mail application, and these two programs might share a "FOO DLL" library. The new software might be a replacement of FOO DLL, and FOO DLL might depend on an existing BAR DLL that is already installed on the machines.

Preferably, the selected target machines include each of the target machines. Steps 106 through 112 represent one of many possible ways to develop such a list, and will be discussed in greater detail below As shown at block 114, an additional step can include identifying relevant test cases based on the list of depending software programs. Block 118 can include instantiating a plurality of test client platforms characteristic of the target machine population Optional steps 116 and 120 through 124 will be discussed in further detail below. Step 126 can include testing the relevant test cases on the plurality of test client platforms to identify failures As noted, steps 106 through 112 represent one possible way to develop the list of programs. Step 106 can include generating a set of distinct candidate test client platform configurations based on at least one predetermined criterion. For example, the criteria could include, but are not limited to, business organization, project, users' job title, geographical location, and the like. At step 108, software dependencies for the new software can be obtained; these are referred to for convenience as first software dependencies. Step 110 can include obtaining software dependencies (referred to for convenience as second software dependencies) for the plurality of existing software programs. The first and second dependencies can be in the form, for example, of a dependency graph or a dependency list. At step 112, the dependencies can be selectively combined to obtain the list of depending software programs. Such selective combination can include, for example, using the aforementioned dependency graphs, dependency lists, or the like to identify software from each that is to be changed or otherwise affected by the new software, for inclusion on the list of depending software programs.

Certain additional optional steps will now be discussed. Step 116 can include pruning the list of distinct candidate test client platform configurations to eliminate those that do not employ the new software and/or the existing software programs on which the new software depends, or are found on a predetermined exclusion list, or are determined by rule-based criteria to qualify for exclusion from test. An exclusion list can contain software program identifiers that are to be excluded for testing with the new software. This list can be created by the deployment team; for example, it can be derived from previous deployment testing results, and updated (if desired, automatically) during the current testing process. An example of rule-based criteria is a cut-off criterion for the number of existing software programs in the target test client platform configurations; if this number is too low, the deployment team may choose not to test it. Another rule-based criterion is the frequency-of-use of existing software.

At step 120, the target machine population can be monitored to detect changes to the population during the testing. At step 122, the plurality of test client platforms can be dynamically updated, responsive to the changes detected during the monitoring Thus, one or more embodiments of the present invention can provide dynamism with respect to addressing updated information and making appropriate adjustments to test strategy. One specific example of dynamic updating will be discussed in connection with block 231 of the high level data flow discussed hereinafter with respect to FIG. 2. Step 124 can include matching the relevant test cases to given ones of the test client platforms. Such matching can include matching to the software on the test client platforms.

The relevant test cases can include one or more of installation test cases, test cases associated with the existing software programs on which the new software depends, and test cases associated with the new software The testing can include one or more of testing for installation failures with the installation test cases, testing for runtime failures with the test cases associated with the existing software programs on which the new software depends, and testing for runtime failures with the test cases associated with the new software. In one exemplary embodiment, there are three distinct sets of test cases that can be run to look for failures: 1) installation test cases for the process of installing the new software, 2) test cases for the existing software that depends on the new software, and 3) test cases for the new software. These set of test cases can first be run in sequence, number 1, followed by number 2, then followed by number 3, as at block 126 (in general, block 126 can include running any one or more of the sets of test cases). Then test cases can then be run in the combination, e.g, number 1 and number 2, number 2 and number 3, number 1 and number 3, and all 3 together, as at block 128 (in general, block 128 can include any combination or combinations of two or more test cases and need not necessarily include all those just set forth). The latter two combinations cover the situation when the new software is being re-installed onto itself, on purpose or accidentally, e.g., by an inexperienced user.

Other optional steps will now be discussed. At step 130, test results can be collected from the plurality of test client platforms Such results can, in general, include, e.g. install and/or runtime failures. At step 132, a list of those of the test client platforms characteristic of the target machine population that experienced installation failures and/or runtime failures can be generated.

At step 134, one or more actions can be taken to deal with detected failures. These can include, for example, fixing the new software to obtain fixed new software, so as to address the installation failures and/or runtime failures. By way of example and not limitation, in some embodiments of the invention, the fixing step may be semi-automated, in that it may require human intervention to fix the problem if a fix cannot be found by a search in a repository of failures and their corresponding fixes Another possibility is to modify installation instructions associated with the new software to obtain modified installation instructions that specify bypassing installation of the new software on those of the machines in the target machine population having a configuration similar to those of the test client platforms that experienced installation failures and/or runtime failures. That is, one can fix the problematic software, or refrain from installing it in places where it is unlikely to work properly. Of course, some combination of these approaches can also be employed At 136, a decision can be made whether the flow is complete for the time being (for example, no problems detected). If so, one can proceed to block 138 until such time as something else needs to be done. If flow is not complete (for example, problems were detected), as indicated at the "NO" branch of decision block 136, one or more of the steps can be repeating with the fixed new software, and with the test client platforms characteristic of the target machine population that experienced installation failures and/or runtime failures substituted for the plurality of test client platforms in instantiating step 116. Additionally or alternatively, as appropriate, depending on what action was taken in step 134, the steps can be repeated with the modified installation instructions and the characteristic platforms that experienced failure.

It will be appreciated that software deployment failure can be reduced by appropriate testing. It is believed that the new software should advantageously be tested against as many different target client platform configurations as possible, and in the shortest amount of time possible One or more exemplary embodiments of the present invention can be employed to generate an appropriate (e.g, minimal) set of platform configurations that can be used for such testing. Furthermore, one or more embodiments of the present invention can enhance test accuracy by avoiding bundling (retaining individual target configurations and testing against same).

Figure 2:
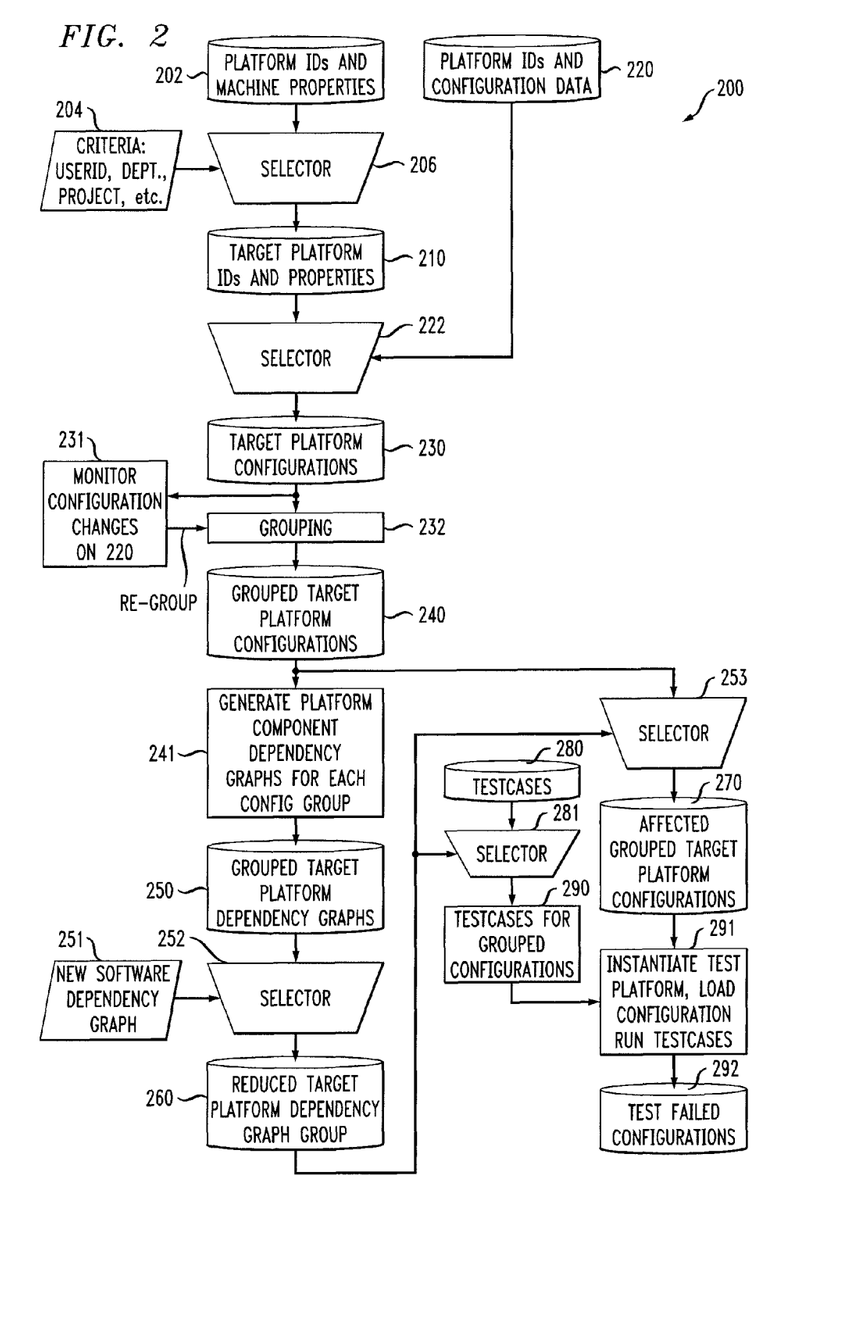
FIG. 2 is a detailed data flow chart depicting data flow according to one specific embodiment of the present invention.

Attention should now be given to FIG. 2, which depicts an exemplary detailed data flow diagram 200, for determining an appropriate (e.g., minimal) set of platform configurations to test and an appropriate (e g, minimal) set of test cases to run, according to one aspect of the present invention. Before new software is deployed in an enterprise, the IT deployment team likely has some idea of the target population of client platforms. Starting from a list of (preferably all) client platforms in the enterprise, as at block 202, the deploy team creates a second list 210 of target client platforms selected from list 202, based on appropriate selection criteria 204, as indicated at block 206. For example, the criteria could include, but are not limited to, business organization, project, users' job title, geographical location, and the like.

The team can then collect the platform configurations for each of the client platforms identified in list 210 from repositories 220 that contain the platform configurations, and put them into a third list 230, using selection logic 222. This selection can be accomplished, e.g., using a relational query language such as SQL. Repositories 220 can be thought of as a federation of relational databases, and list 210 can contain the input parameters for the query expressions that are executed against the repositories 220; the resulting set is list 230 This task is made easier by the fact that in a large enterprise, these client platform configurations have likely already been collected and stored in centrally managed repositories 220. Such information can be used for many purposes, such as inventory control of client platforms for accounting, compliance with corporate security policies, and determining site license fees for the number of software programs in use. Typical configuration information collected can include owner's name, owning department number, machine type, machine serial number, operating system (OS) version number and service pack version, platform version, software components and their version number, and the like. Alternatively, the machine configuration can be obtained by directly polling the client platforms. This may be appropriate where the configuration information in the central repository is missing or outdated.

Note that actions are referred to as being taken by "the team," however, any one or more steps shown in FIGS. 1 and 2 can be automated and implemented by a computer. Furthermore, in the exemplary embodiments of FIGS. 1 and 2, one or more steps can be added, omitted, or changed in order.

Once the list 230 of target client platform configurations is assembled, the list can be sorted and the platforms with the same hardware and software configuration can be grouped as at block 232 (for example, the same platform type, same OS version, service pack version and/or same software and software version can be grouped). From each group, one can select an appropriate platform configuration to represent that group, and add it to a list 240 of distinct platform configurations Note that ongoing monitoring can be conducted of list 220, and detected configuration changes can result in appropriate re-grouping, as shown at block 231. To keep list 230 up to date when list 220 changes, monitors can be added to list 220 to look for new or updated client platform configurations that satisfy the selection criteria 204 but were not already in list 230, and/or for removing and updating of client platform configurations that are found in list 230. When any one of these changes is detected, list 230 can be updated, and all subsequent lists derived from this list can also be updated, i.e., lists 240, 250, 270 and 290

Appropriate test cases to use for each client platform configuration in list 240 can be identified. Temporarily, one can create a set of all top level software components installed on each of the distinct platforms in list 240, and can generate dependency graphs (as discussed above with respect to FIG. 1, dependency lists could also be used) for each software component, as at block 241 One can keep track of which platform configuration has which software components One can do the same for the new software that is to be deployed, as at block 251. The dependency graph of the new software (again, a dependency list could also be used) can be compared to the dependency graphs 241 generated from list 240. For each distinct platform in list 240, its software dependency graph, or list, is sorted into grouped target platform dependency graphs 250 and compared by selector 252 with the dependency graph 251, or list, of the new software. Wherever there is intersection between the two graphs, or lists, that software component is added to list 260 for that platform. List 260 contains the identities of software that potentially could be adversely affected by the installation of the new software, and the identities of existing software that the new software depends on. List 260 can be used for two purposes: 1) to prune list 240 (via selector 253), removing those client platform configurations that are not in list 260, generating list 270; and 2) to identify and select (via selector 281) the relevant test cases 290 from a repository of test cases 280 that will be used for testing. One can do additional pruning of list 270 and list 290 with, e.g., a "lookaside" exclusion list or rule-based criteria.

As shown in block 291, for each client platform configuration in block 270, a test client platform can be created and configured with the platform configuration. This test client platform can be created as a virtual client on a server or on a client platform that is similar to the target client platform. Multiple instances of test client platforms can also be created to improve the chance of catching any timing related or race condition type of problems. For each test client platform, the new software can be installed, and proper installation without errors can be verified; if the installation failed, the failed client configuration can be recorded in a list 292.

One can sequentially or randomly execute and run the test cases in list 290 that are pertinent to the software components contained in the test client configuration, and correct running of all test cases can be verified. If any test case(s) fail, and such failure is determined to be caused by the new software, the client configuration that experienced the failure can be added to list 292.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated Furthermore, one or more embodiments of the invention can be implemented in the form of an apparatus including a memory and at least one processor that is coupled to the memory and operative to perform exemplary method steps.

Figure 3:
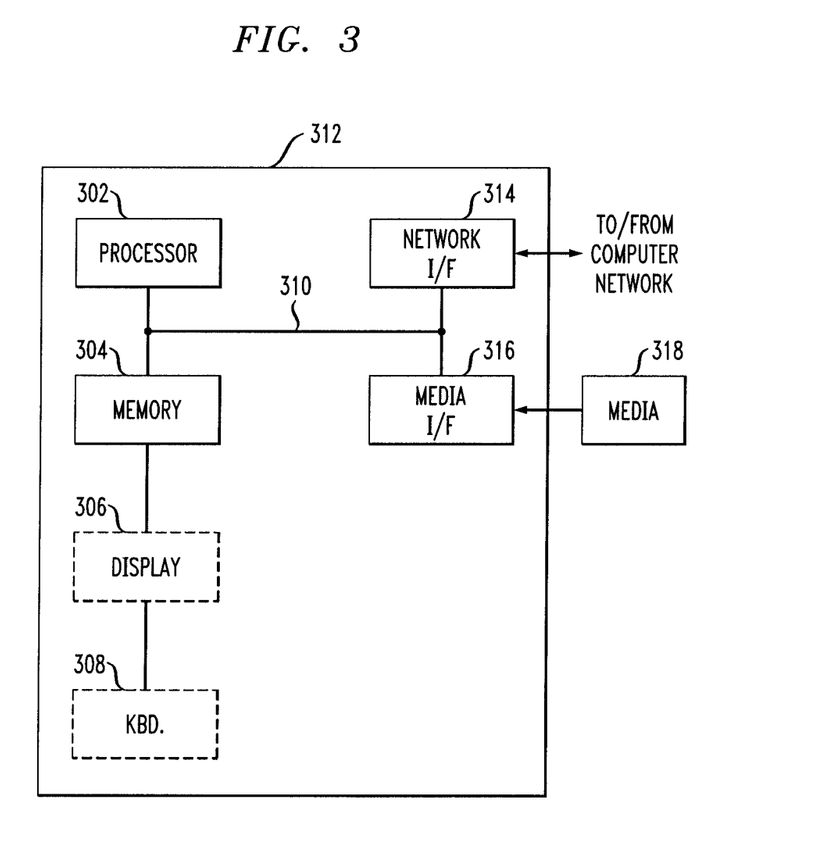
FIG. 3 depicts a computer system that may be useful in implementing one or more aspects and/or elements of the present invention

At present, it is believed that the preferred implementation will make substantial use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (e g, ROM, fixed or removable memory) and, when ready to be utilized, loaded in part or in whole (e g, into RAM) and executed by a CPU. Such software could include, but is not limited to, firmware, resident software, microcode, and the like Furthermore, the invention can take the form of a computer program product accessible from a computer-usable or computer-readable medium (e.g, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g memory 304), magnetic tape, a removable computer diskette (e.g. media 318), a random access memory (RAM), a read-only memory (ROM), a rigid magnetic disk and an optical disk. Current examples of optical disks include compact disk-read only memory (CD-ROM), compact disk-read/write (CD-R/W) and DVD A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or devices (including but not limited to keyboards 308, displays 306, pointing devices, and the like) can be coupled to the system either directly (such as via bus 310) or through intervening I/O controller's (omitted for clarity).

Network adapters such as network interface 314 may also be coupled to the system to enable the data processing system to become coupled to other data processing systems or remote printers or storage devices through intervening private or pubic networks. Modems, cable modem and Ethernet cards are just a few of the currently available types of network adapters In any case, it should be understood that the components illustrated herein may be implemented in various forms of hardware, software, or combinations thereof, e.g, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for testing new software to be deployed on a target machine population having a plurality of target machines, the target machines having a plurality of existing software programs, said method comprising the steps of:
   obtaining a list of depending software programs on selected ones of the target machines, said list comprising:
      those of the existing software programs that depend on the new software; and
      those of the existing software programs on which the new software depends, wherein said obtaining step comprises:
         generating a set of distinct candidate test client platform configurations based on at least one predetermined criterion;
   obtaining a list of two or more test client platforms, wherein each test client platform defines a configuration of a client platform, wherein said obtaining the list of the two or more test client platforms comprises:
      collecting platform configurations for each of the distinct candidate test client platform configurations in the set from a plurality of repositories;
   identifying relevant test cases based on said list of depending software programs;
   grouping the two or more test client platforms into groups based on at least one of hardware and software similarities;

selecting a test client platform from each group to represent the group, wherein the set of distinct candidate test client platform configurations is comprised of the selected test client platforms;

instantiating one or more of the selected test client platforms, wherein the one or more instantiated test client platforms are characteristic of the target machine population;

testing said relevant test cases on said one or more instantiated test client platforms to identify failures;

monitoring the target machine population to detect changes to the target machine population during said testing; and dynamically updating said list of two or more test client platforms, said relevant test cases and said grouping responsive to said changes detected during said monitoring.

2. The method of claim 1, further comprising the additional step of matching said relevant test cases to given ones of said selected test client platforms.

3. The method of claim 2, further comprising the additional step of collecting test results from said instantiated test client platforms.

4. The method of claim 3, wherein said relevant test cases comprise at least installation test cases and said testing comprises at least testing for installation failures.

5. The method of claim 3, wherein said relevant test cases comprise at least test cases associated with the existing software programs that depend on the new software and said testing comprises at least testing for runtime failures with said test cases associated with the existing software programs that depend on the new software.

6. The method of claim 3, wherein said relevant test cases comprise at least test cases associated with the new software and said testing comprises at least testing for runtime failures with said test cases associated with the new software.

7. The method of claim 3, wherein:
said relevant test cases comprise at least two of:
installation test cases;
test cases associated with the existing software programs that depend on the new software; and
test cases associated with the new software; and
said testing comprises at least running at least two of said relevant cases in combination.

8. The method of claim 7, further comprising the additional step of generating a list of those of said selected test client platforms characteristic of the target machine population that experienced at least one of said installation failures and said runtime failures.

9. The method of claim 8, further comprising the additional step of fixing the new software to obtain fixed new software and to address said at least one of said installation failures and said runtime failures.

10. The method of claim 9, further comprising the additional step of repeating at least said obtaining, identifying, selecting, instantiating, testing, and generating steps with said fixed new software and with said instantiated test client platforms characteristic of the target machine population that experienced at least one of said installation failures and said runtime failures substituted for said instantiated test client platforms characteristic of the target machine population in said instantiating step.

11. The method of claim 8, further comprising the additional step of modifying installation instructions associated with said new software to obtain modified installation instructions and to bypass installation of the new software on those of said machines in the target machine population having a configuration similar to those of said test client platforms that experienced said at least one of said installation failures and said runtime failures.

12. The method of claim 11, further comprising the additional step of repeating said obtaining, identifying, selecting, instantiating, testing, and generating steps with said modified installation instructions and with said instantiated test client platforms characteristic of the target machine population that experienced at least one of said installation failures and said runtime failures substituted for said instantiated test client platforms characteristic of the target machine population in said instantiating step.

13. The method of claim 1, wherein said obtaining step further comprises:
obtaining first software dependencies for the new software;
obtaining second software dependencies for the plurality of existing software programs; and
selectively combining said dependencies to obtain said list of depending software programs.

14. The method of claim 1, further comprising the additional step of pruning said set of distinct candidate test client platform configurations to eliminate those of said distinct candidate test client platform configurations that satisfy at least one of the following:
do not employ at least one of the new software and the existing software programs on which the new software depends;
are found on a predetermined exclusion list; and
are determined by rule-based criteria to qualify for exclusion from test.

15. The method of claim 1, wherein the collecting is performed using selection logic, wherein the set of distinct candidate test client platform configurations includes input parameters for query expressions that are executed against the repositories.

16. A computer program product comprising a non-transitory computer readable medium having computer useable program code for testing new software to be deployed on a target machine population having a plurality of target machines, the target machines having a plurality of existing software programs, said computer program product including:
computer useable program code for obtaining a list of depending software programs on selected ones of the target machines, said list comprising:
those of the existing software programs that depend on the new software; and
those of the existing software programs on which the new software depends, wherein said obtaining comprises:
generating a set of distinct candidate test client platform configurations based on at least one predetermined criterion;
computer useable program code for obtaining a list of two or more test client platforms, wherein each test client platform defines a configuration of a client platform, wherein said obtaining the list of the two or more test client platforms comprises:
collecting platform configurations for each of the distinct candidate test client platform configurations in the set from a plurality of repositories;
computer useable program code for identifying relevant test cases based on said list of depending software programs;
computer useable program code for grouping the two or more test client platforms into groups based on at least one of hardware and software similarities;

computer useable program code for selecting a test client platform from each group to represent the group, wherein the set of distinct candidate test client platform configurations is comprised of the selected test client platforms;

computer useable program code for instantiating one or more of the selected test client platforms, wherein the one or more instantiated test client platforms are characteristic of the target machine population;

computer useable program code for testing said relevant test cases on said one or more instantiated test client platforms to identify failures;

computer useable program code for monitoring the target machine population to detect changes to the target machine population during said testing; and computer useable program code for dynamically updating said list of two or more test client platforms, said relevant test cases and said grouping responsive to said changes detected during said monitoring.

17. The computer program product of claim 16, wherein said product further comprises computer useable program code for matching said relevant test cases to given ones of said selected test client platforms.

18. The computer program product of claim 17, wherein said product further comprises computer useable program code for collecting test results from said instantiated test client platforms.

19. The computer program product of claim 16, wherein the collecting is performed using selection logic, wherein the set of distinct candidate test client platform configurations includes input parameters for query expressions that are executed against the repositories.

20. An apparatus for testing new software to be deployed on a target machine population having a plurality of target machines, the target machines having a plurality of existing software programs, comprising:

a memory; and at least one processor coupled to said memory and operative to:

obtain a list of depending software programs on selected ones of the target machines, said list comprising:

those of the existing software programs which depend on the new software; and those of the existing software programs on which the new software depends, wherein said at least one processor is further operative to:

generate a set of distinct candidate test client platform configurations based on at least one predetermined criterion;

obtain a list of two or more test client platforms, wherein each test client platform defines a configuration of a client platform, wherein obtaining the list of the two or more test client platforms comprises:

collecting platform configurations for each of the distinct candidate test client platform configurations in the set from a plurality of repositories;

identify relevant test cases based on said list of depending software programs;

group the two or more test client platforms into groups based on at least one of hardware and software similarities;

select a test client platform from each group to represent the group, wherein the set of distinct candidate test client platform configurations is comprised of the selected test client platforms;

instantiate one or more of the selected test client platforms, wherein the of one or more instantiated test client platforms are characteristic of the target machine population;

test said relevant test cases on said one or more instantiated test client platforms to identify failures;

monitor the target machine population to detect changes to the target machine population during said testing; and dynamically update said list of two or more test client platforms, said relevant test cases and said grouping responsive to said changes detected during said monitoring.

21. The apparatus of claim 20, wherein said processor is further operative to match said relevant test cases to given ones of said selected test client platforms.

22. The apparatus of claim 20, wherein the collecting is performed using selection logic, wherein the set of distinct candidate test client platform configurations includes input parameters for query expressions that are executed against the repositories.

* * * * *